United States Patent
Nakatani et al.

(10) Patent No.: US 11,489,152 B2
(45) Date of Patent: Nov. 1, 2022

(54) SULFUR-CARBON MATERIAL COMPOSITE BODY, POSITIVE ELECTRODE MATERIAL FOR LITHIUM SULFUR SECONDARY BATTERIES, AND LITHIUM SULFUR SECONDARY BATTERY

(71) Applicant: SEKISUI CHEMICAL CO., LTD., Osaka (JP)

(72) Inventors: Hiroyuki Nakatani, Osaka (JP); Shoji Nozato, Osaka (JP); Hiromori Tsutsumi, Ube (JP); Kazuhide Ueno, Ube (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 191 days.

(21) Appl. No.: 16/614,768

(22) PCT Filed: May 31, 2018

(86) PCT No.: PCT/JP2018/020981
§ 371 (c)(1),
(2) Date: Nov. 18, 2019

(87) PCT Pub. No.: WO2018/225619
PCT Pub. Date: Dec. 13, 2018

(65) Prior Publication Data
US 2020/0176763 A1    Jun. 4, 2020

(30) Foreign Application Priority Data
Jun. 5, 2017  (JP) .............................. JP2017-110629

(51) Int. Cl.
*H01M 4/02*       (2006.01)
*H01M 4/36*       (2006.01)
(Continued)

(52) U.S. Cl.
CPC ........... *H01M 4/366* (2013.01); *C01B 32/194* (2017.08); *C01B 32/225* (2017.08); *H01M 4/38* (2013.01);
(Continued)

(58) Field of Classification Search
CPC ....................................................... H01M 4/02
See application file for complete search history.

(56) References Cited

U.S. PATENT DOCUMENTS

| | | |
|---|---|---|
| 6,110,619 A | 8/2000 | Zhang et al. |
| 2012/0088154 A1 | 4/2012 | Liu et al. |

(Continued)

FOREIGN PATENT DOCUMENTS

| | | |
|---|---|---|
| CN | 101847720 A | 9/2010 |
| CN | 103155243 A | 6/2013 |

(Continued)

OTHER PUBLICATIONS

Written Opinion of the International Searching Authority (PCT/ISA/237) for Application No. PCT/JP2018/020981 dated Jul. 3, 2018 (English Translation mailed Dec. 19, 2019).

(Continued)

*Primary Examiner* — Jacob B Marks
(74) *Attorney, Agent, or Firm* — Cheng Law Group, PLLC

(57) ABSTRACT

Provided is a sulfur-carbon material composite body which, when used for an electrode of a secondary battery, is unlikely to degrade cycle characteristics at the time of charging and discharging of the secondary battery. Disclosed is a sulfur-carbon material composite body including a first carbon material having a graphene layered structure; a spacer at least partially disposed between graphene layers of the first carbon material or at an end of the first carbon material; and sulfur or a sulfur-containing compound at least (Continued)

partially disposed between the graphene layers of the first carbon material or at the end of the first carbon material.

7 Claims, 1 Drawing Sheet

(51) Int. Cl.
| | | |
|---|---|---|
| *C01B 32/194* | (2017.01) | |
| *C01B 32/225* | (2017.01) | |
| *H01M 4/38* | (2006.01) | |
| *H01M 4/587* | (2010.01) | |
| *H01M 10/052* | (2010.01) | |

(52) U.S. Cl.
CPC ......... *H01M 4/587* (2013.01); *H01M 10/052* (2013.01); *C01B 2204/22* (2013.01); *C01B 2204/32* (2013.01); *C01P 2006/12* (2013.01); *C01P 2006/40* (2013.01); *H01M 2004/028* (2013.01)

(56) References Cited

U.S. PATENT DOCUMENTS

| | | | |
|---|---|---|---|
| 2013/0119321 A1* | 5/2013 | Lettow | H01B 1/08 252/510 |
| 2013/0164635 A1 | 6/2013 | Schmidt et al. | |
| 2013/0171355 A1 | 7/2013 | Wang et al. | |
| 2014/0030590 A1 | 1/2014 | Wang et al. | |
| 2014/0203469 A1 | 7/2014 | Liu et al. | |
| 2014/0315100 A1 | 10/2014 | Wang et al. | |
| 2015/0175778 A1 | 6/2015 | Nozato et al. | |
| 2015/0270534 A1 | 9/2015 | Nozato et al. | |
| 2017/0054149 A1 | 2/2017 | Wang et al. | |
| 2017/0133667 A1 | 5/2017 | Mihara et al. | |
| 2017/0210876 A1 | 7/2017 | Nozato et al. | |
| 2017/0229703 A1* | 8/2017 | Chu | H01M 4/38 |

FOREIGN PATENT DOCUMENTS

| | | |
|---|---|---|
| CN | 105190965 A | 12/2015 |
| CN | 106663797 A | 5/2017 |
| JP | 2010-95390 A | 4/2010 |
| JP | 2012-204332 A | 10/2012 |
| JP | 2013-527579 A | 6/2013 |
| JP | 2013-139371 A | 7/2013 |
| JP | 2013-214503 A | 10/2013 |
| JP | 2013-539193 A | 10/2013 |
| JP | 2015-179615 A | 10/2015 |
| WO | WO-2014/034156 A1 | 3/2014 |

OTHER PUBLICATIONS

International Search Report for Application No. PCT/JP2018/020981 dated Jul. 3, 2018.
Written Opinion of the International Searching Authority (PCT/ISA/237) for Application No. PCT/JP2018/020981 dated Jul. 3, 2018.
Yang, Xi et al., "Sulfur-Infiltrated Graphene-Based Layered Porous Carbon Cathodes for High-Performance Lithium-Sulfur Batteries", ACS NANO, 2014, vol. 8, No. 5, pp. 5208-5215.
Supplementary European Search Report for Application No. EP 18 812 935.7 dated Feb. 1, 2021.
Taiwanese Office Action for the Application No. 107119294 dated Nov. 9, 2021.
The First Office Action for the Application No. 201880031443.3 from The State Intellectual Property Office of the People's Republic of China dated Jul. 5, 2022.

* cited by examiner

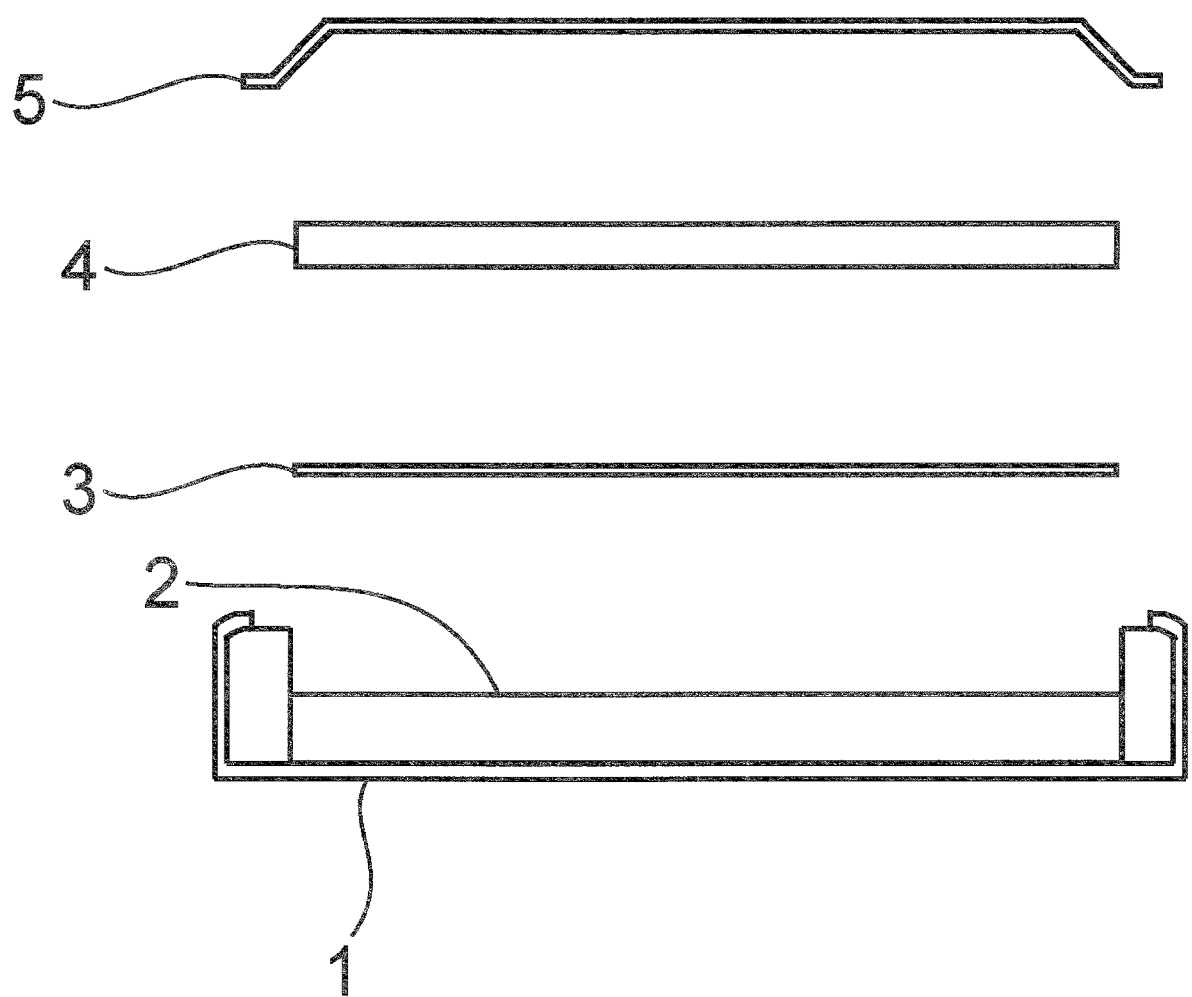

SULFUR-CARBON MATERIAL COMPOSITE BODY, POSITIVE ELECTRODE MATERIAL FOR LITHIUM SULFUR SECONDARY BATTERIES, AND LITHIUM SULFUR SECONDARY BATTERY

TECHNICAL FIELD

The present invention relates to a sulfur-carbon material composite body containing sulfur and a carbon material, a positive electrode material for lithium sulfur secondary batteries including the sulfur-carbon material composite body, and a lithium sulfur secondary battery.

BACKGROUND ART

Conventionally, lithium ion secondary batteries are widely used for small-sized communication devices such as cellular phones and laptop computers, information terminal applications, and vehicle applications such as electric vehicles. Since lithium ion secondary batteries have a high energy density, it is possible to achieve downsizing and weight reduction of the device. However, as further use expansion is expected in the future, an even higher capacity is required.

In order to increase the capacity of a lithium ion secondary battery, it is indispensable to expand the capacity by active materials of a positive electrode and a negative electrode. Regarding the positive electrode, since a conventional metal oxide-based active material has a limit in capacity, sulfur-based active materials have been proposed and investigated as new active materials capable of innovative capacity expansion.

Patent Document 1 below discloses, as a positive electrode material for a secondary battery, a mesoporous carbon composite material containing mesoporous carbon and sulfur disposed in mesopores of the mesoporous carbon. Patent Document 2 discloses, as a positive electrode material for a secondary battery, a composite body containing sulfur particles encapsulated in Ketjen black. Patent Document 3 discloses, as a positive electrode material for a secondary battery, a carbon-sulfur composite body containing sulfur filled in voids between thin layer graphite structures. In Patent Document 3, the average length of the voids is less than 3 nm.

RELATED ART DOCUMENT

Patent Documents

Patent Document 1: JP 2010-95390
Patent Document 2: JP 2012-204332
Patent Document 3: JP 2013-214503

SUMMARY OF THE INVENTION

Problems to be Solved by the Invention

However, the positive electrode material of Patent Document 1 or Patent Document 2 has a problem that sulfur cannot be sufficiently supported due to the structure of the positive electrode material. Thus, at the time of charging and discharging of a secondary battery, polysulfide elutes into an electrolytic solution, which may degrade cycle characteristics. The positive electrode material of Patent Document 3 has a problem that the electrode capacity is restricted because a sufficient gap to be filled with sulfur cannot be secured.

An object of the present invention is to provide a sulfur-carbon material composite body which, when used for an electrode of a secondary battery, is unlikely to degrade cycle characteristics of the secondary battery at the time of charging and discharging of the secondary battery, a positive electrode material for lithium sulfur secondary batteries including the sulfur-carbon material composite body, and a lithium sulfur secondary battery.

Means for Solving the Problems

A sulfur-carbon material composite body according to the present invention includes a first carbon material having a graphene layered structure; a spacer at least partially disposed between graphene layers of the first carbon material or at an end of the first carbon material; and sulfur or a sulfur-containing compound at least partially disposed between the graphene layers of the first carbon material or at the end of the first carbon material.

In a specific aspect of the sulfur-carbon material composite body according to the present invention, a content of the sulfur or sulfur-containing compound in the sulfur-carbon material composite body is 20% by weight or more and 90% by weight or less.

In another specific aspect of the sulfur-carbon material composite body according to the present invention, the first carbon material is exfoliated graphite.

In still another specific aspect of the sulfur-carbon material composite body according to the present invention, the first carbon material is partially exfoliated graphite which has a graphite structure and in which graphite is partially exfoliated.

In still another specific aspect of the sulfur-carbon material composite body according to the present invention, a C/O ratio of the first carbon material is 2 or more and 20 or less.

In still another specific aspect of the sulfur-carbon material composite body according to the present invention, the spacer contains a resin.

In still another specific aspect of the sulfur-carbon material composite body according to the present invention, the spacer contains a second carbon material different from the first carbon material.

A positive electrode material for lithium sulfur secondary batteries according to the present invention includes a sulfur-carbon material composite body constituted according to the present invention.

A lithium sulfur secondary battery according to the present invention includes a positive electrode composed of the positive electrode material for lithium sulfur secondary batteries constituted according to the present invention.

Effect of the Invention

According to the present invention, it is possible to provide a sulfur-carbon material composite body which, when used for an electrode of a secondary battery, is unlikely to degrade cycle characteristics at the time of charging and discharging of the secondary battery.

BRIEF DESCRIPTION OF DRAWING

FIG. 1 is a schematic diagram for illustrating a method of fabricating a lithium sulfur secondary battery in examples and comparative examples.

MODE(S) FOR CARRYING OUT THE INVENTION

The details of the present invention will be described below based on specific embodiments. The present invention is not limited to the following embodiments.

[Sulfur-Carbon Material Composite Body]

The sulfur-carbon material composite body of the present invention includes a carbon material having a graphene layered structure, a spacer, and sulfur or a sulfur-containing compound. At least a portion of the spacer is disposed between graphene layers of the carbon material or at an end of the carbon material. It is preferable that at least a portion of the spacer be disposed between the graphene layers of the carbon material. At least a portion of the sulfur or sulfur-containing compound is disposed between the graphene layers of the carbon material or at the end of the carbon material. It is preferable that at least a portion of the sulfur or sulfur-containing compound be disposed between the graphene layers of the carbon material. In the present invention, it is preferable that all of the sulfur or sulfur-containing compound be disposed between the graphene layers of the carbon material. However, a portion of the sulfur or sulfur-containing compound may be provided on a surface of the carbon material.

Here, for example, when the sulfur-carbon material composite body of the present invention is used for an electrode of a secondary battery, whether or not at least a portion of the spacer is disposed between the graphene layers of the carbon material or at the end of the carbon material can be confirmed by observing a cross section of the electrode cut by a slicer with SEM (scanning electron microscope).

Further, for example, when the sulfur-carbon material composite body of the present invention is used for the electrode of the secondary battery, whether or not at least a portion of the sulfur or sulfur-containing compound is disposed between the graphene layers of the carbon material or at the end of the carbon material can be confirmed as follows. Specifically, the cross section of the electrode cut by the slicer is observed with a SEM-EDX apparatus (product number "S-4300 SE/N" manufactured by Hitachi High-Technologies Corporation), and can be identified by mapping with two kinds of elements (carbon and sulfur).

Since the sulfur-carbon material composite body of the present invention contains the carbon material having a graphene layered structure, the conductivity is enhanced. In addition to the sulfur or sulfur-containing compound, the spacer is provided between the graphene layers of the carbon material. When such a sulfur-carbon material composite body is used as, for example, a positive electrode of a secondary battery and charging and discharging are repeated, elution of the sulfur or sulfur-containing compound into an electrolytic solution is suppressed by the spacer. The elution of the sulfur or sulfur-containing compound into the electrolytic solution is suppressed, so that the cycle characteristics due to repetition of charging and discharging are hardly degraded, and the capacity of the secondary battery can be maintained at a high level.

As described above, when the sulfur-carbon material composite body of the present invention is used for an electrode of a secondary battery, the cycle characteristics at the time of charging and discharging of the secondary battery are unlikely to be degraded, and the capacity can be maintained at a high level.

Details of each material constituting the sulfur-carbon material composite body of the present invention will be described below.

(Carbon Material Having a Graphene Layered Structure)

Examples of the carbon material having a graphene layered structure include graphite, exfoliated graphite, and exfoliated graphite oxide.

Graphite is a stack of a plurality of graphene sheets. The number of stacked layers of graphene sheets of graphite is usually about 100,000 to 1,000,000. As the graphite, natural graphite, artificial graphite, expanded graphite, or the like can be used, for example. The distance between graphene layers is larger in expanded graphite than in common graphite. Therefore, it is preferable to use expanded graphite as the graphite.

Exfoliated graphite is obtained by subjecting original graphite to exfoliation treatment, and refers to a graphene sheet stack thinner than the original graphite. The number of stacked layers of graphene sheets in the exfoliated graphite may be smaller than that in the original graphite In the exfoliated graphite, the number of stacked layers of graphene sheets is preferably 1,000 or less, more preferably 500 or less. When the number of stacked layers of graphene sheets is the above-mentioned maximum number or less, the specific surface area of the exfoliated graphite can be further increased.

The exfoliated graphite is preferably partially exfoliated graphite having a structure in which graphite is partially exfoliated.

More specifically, the description "graphite is partially exfoliated" refers to the fact that graphene layers are spaced from the end edge to some depth of the inside in a graphene stack, that is, graphite is partially exfoliated at the end edge, and a graphite layer is laminated in the same manner as the original graphite or primary exfoliated graphite at a portion on the center side. Therefore, a portion where graphite is partially exfoliated at the end edge is continuous with the portion on the center side. In addition, the partially exfoliated graphite may include one in which graphite at the end edge is exfoliated.

Here, when the exfoliated graphite is the partially exfoliated graphite having a structure in which graphite is partially exfoliated, it can be said that the spacer and the sulfur or sulfur-containing compound are disposed between the graphene layers of the carbon material, even when the spacer and the sulfur or sulfur-containing compound exist between graphene layers where a space between the layers is increased by partial exfoliation of graphite.

As described above, in the partially exfoliated graphite, graphite layers are stacked in the portion on the center side similar to the original graphite or primary exfoliated graphite. Thus, the partially exfoliated graphite has a higher degree of graphitization than conventional graphene oxide and carbon black, and is excellent in conductivity. Therefore, when the partially exfoliated graphite is used for an electrode of a secondary battery, electron conductivity in the electrode can be further increased, and charging and discharging with a larger current become possible.

Such partially exfoliated graphite can be obtained by preparing a composition which contains graphite or primary exfoliated graphite and a resin and in which the resin is fixed to the graphite or the primary exfoliated graphite by grafting or adsorption, and pyrolyzing the composition. It is preferable that a portion of the resin contained in the composition remain. That is, it is preferable that the partially exfoliated graphite is resin-retained partially exfoliated graphite. However, the partially exfoliated graphite may be partially exfoliated graphite from which the resin has been removed thoroughly.

Resin-retained partially exfoliated graphite is a composite material containing partially exfoliated graphite in which the distance between graphene layers is increased and a resin remaining between the graphene layers of the partially exfoliated graphite and bonded to graphene constituting the partially exfoliated graphite.

Such resin-retained partially exfoliated graphite can be produced, for example, by the production method described in WO 2014/034156. That is, for example, by pyrolyzing a resin contained in a raw material composition in which the resin is fixed to graphite or primary exfoliated graphite, the resin-retained partially exfoliated graphite can be produced by a method of exfoliating the graphite or the primary exfoliated graphite while leaving a portion of the resin.

As the graphite used as a raw material, expanded graphite is preferred. The distance between graphene layers is larger in expanded graphite than in usual graphite, so that expanded graphite can be easily exfoliated. Therefore, by using the expanded graphite as the raw material graphite, the resin-retained partially exfoliated graphite can be easily produced.

In the above graphite, the number of stacked layers of graphene is about 100,000 to 1,000,000, and the BET specific surface area is a value of 20 $m^2/g$ or less.

On the other hand, in the resin-retained partially exfoliated graphite, the number of stacked layers of graphene is preferably 3,000 or less. The BET specific surface area of the resin-retained partially exfoliated graphite is preferably 40 $m^2/g$ or more, and more preferably 100 $m^2/g$ or more. An upper limit value of the BET specific surface area of the resin-retained partially exfoliated graphite is usually 2,500 $m^2/g$ or less.

As the raw material, primary exfoliated graphite may be used instead of graphite. The primary exfoliated graphite widely includes, in addition to the exfoliated graphite obtained by exfoliating graphite, the partially exfoliated graphite, and the resin-retained partially exfoliated graphite, exfoliated graphite obtained by exfoliating graphite with a conventionally known method. The primary exfoliated graphite is obtained by exfoliating graphite, so that its specific surface area may be enough to be larger than that of graphite.

The resin contained in the resin-retained partially exfoliated graphite is not particularly limited and is preferably a polymer of a radical polymerizable monomer. In this case, the resin may be a homopolymer of one radical polymerizable monomer or a copolymer of a plurality of radical polymerizable monomers. The radical polymerizable monomer is not particularly limited as long as it is a monomer having a radical polymerizable functional group.

Examples of the radical polymerizable monomer include styrene, methyl α-ethylacrylate, methyl α-benzylacrylate, methyl α-[2,2-bis(carbomethoxy)ethyl]acrylate, dibutyl itaconate, dimethyl itaconate, dicyclohexyl itaconate, α-methylene-δ-valerolactone, α-methylstyrene, α-substituted acrylates comprising α-acetoxystyrene, vinyl monomers having a glycidyl group or a hydroxyl group such as glycidyl methacrylate, 3,4-epoxycyclohexylmethyl methacrylate, hydroxyethyl methacrylate, hydroxyethyl acrylate, hydroxypropyl acrylate, and 4-hydroxybutyl methacrylate; vinyl monomers having an amino group such as allylamine, diethylaminoethyl (meth)acrylate, and dimethylaminoethyl (meth)acrylate; monomers having a carboxyl group such as methacrylic acid, maleic anhydride, maleic acid, itaconic acid, acrylic acid, crotonic acid, 2-acryloyloxyethyl succinate, 2-methacryloyloxyethyl succinate, and 2-methacryloyloxyethylphthalic acid; monomers having a phosphate group such as Phosmer M, Phosmer C L, Phosmer P E, Phosmer M H, and Phosmer P P manufactured by Uni-Chemical Co., Ltd.; monomers having an alkoxysilyl group such as vinyltrimethoxysilane and 3-methacryloxypropyltrimethoxysilane; and (meth)acrylate monomers having an alkyl group, a benzyl group, or the like.

As the resin contained in the resin-retained partially exfoliated graphite, polypropylene glycol, polyethylene glycol, styrene polymer (polystyrene), vinyl acetate polymer (polyvinyl acetate), polyglycidyl methacrylate, or a butyral resin is preferred. The above resins may be used alone or in combination.

The content of the resin in the resin-retained partially exfoliated graphite is preferably 1% by mass to 60% by mass. The content is more preferably 5% by mass to 30% by mass, further preferably 10% by mass to 20% by mass. When the content of the resin is too low, the handling properties decrease and sulfur cannot be sufficiently inserted between the graphene layers in some cases. When the content of the resin is too high, a sufficient amount of sulfur cannot be inserted between the graphene layers in some cases.

In the resin-retained partially exfoliated graphite, since there is no oxidation step at the time of production, graphene has not been oxidized. Therefore, excellent conductivity is developed. In addition, since the graphene is not oxidized, complicated reduction treatment at high temperature and in the presence of an inert gas is not required.

In addition, in the resin-retained partially exfoliated graphite, the distance between graphene layers is increased, and its specific surface area is large. Further, the resin-retained partially exfoliated graphite has a graphite structure in the central portion and has an exfoliated structure in the edge portion, so that the resin-retained partially exfoliated graphite is more easily handled than conventional exfoliated graphite. In addition, the resin-retained partially exfoliated graphite contains a resin and therefore has high dispersibility in a different resin. Particularly, when the different resin is a resin having a high affinity for the resin contained in the resin-retained exfoliated graphite, the dispersibility of the resin-retained partially exfoliated graphite in the different resin is further increased.

In the present invention, the C/O ratio of the carbon material having a graphene layered structure is preferably 2 or more and 20 or less. When the C/O ratio of the carbon material is within the above range, the conductivity of the sulfur-carbon material composite body can be further enhanced.

In the present invention, when the methylene blue adsorption amount (μmol/g) per 1 g of the carbon material having a graphene layered structure is defined as y and the BET specific surface area ($m^2/g$) of the carbon material is defined as x, the ratio y/x is preferably 0.15 or more. Although an upper limit of the ratio y/x is not particularly limited, the upper limit can be, for example, about 1.0.

The methylene blue adsorption amount (μmol/g) is measured as follows. First, the absorbance (blank) of a methanol solution of methylene blue at a concentration of 10 mg/L is measured. Next, an object to be measured (the above-described carbon material) is charged into the methanol solution of methylene blue, and the absorbance (sample) of the supernatant obtained by centrifugation is measured. Finally, the methylene blue adsorption amount (μmol/g) per 1 g is calculated from a difference between the absorbance (blank) and the absorbance (sample).

There is a correlation between the methylene blue adsorption amount and the specific surface area of the carbon material determined by BET. When the BET specific surface area (m²/g) is defined as x and the above-mentioned methylene blue adsorption amount (µmol/g) is defined as y in conventionally known spherical graphite particles, x and y satisfy a relationship of y≈0.13x. This indicates that the methylene blue adsorption amount increases as the BET specific surface area become larger. Therefore, the methylene blue adsorption amount can be an index instead of the BET specific surface area.

In the present invention, as described above, the ratio y/x of the carbon material is preferably 0.15 or more. In contrast, in the conventional spherical graphite particles, the ratio y/x is 0.13. Therefore, when the ratio y/x is 0.15 or more, the methylene blue adsorption amount increases though the BET specific surface area is the same as that of the conventional spherical graphite. In other words, in this case, condensation occurs to some extent in a dry state, but in a wet state such as in methanol, the distance between graphene layers or between graphite layers can be much more increased than in the dry state. Examples of the carbon material having a ratio y/x of 0.15 or more include the resin-retained partially exfoliated graphite described above.

(Spacer)

It is preferable that at least a portion of the spacer be disposed between the graphene layers of the carbon material having a graphene layered structure. The spacer may be disposed between the graphene layers at the end of the carbon material. Although it is preferable that the entire spacer be disposed between the graphene layers of the carbon material, a portion of the spacer may not be disposed between the graphene layers of the carbon material. In this case, the portion of the spacer may be attached to an end face of the graphene layer of the carbon material or may be attached to a surface of the carbon material.

It is desirable that the spacer is bonded to graphene constituting the carbon material by adsorption or grafting between the graphene layers of the carbon material having a graphene layered structure.

Examples of the material of the spacer include a resin. Examples of the resin include, but are not particularly limited to, polypropylene glycol, polyethylene glycol, styrene polymer, vinyl acetate polymer, polyglycidyl methacrylate, and butyral resin.

When the spacer is a resin, for example, the resin-retained partially exfoliated graphite described above can be used. In this case, the remaining resin is the spacer, and the partially exfoliated graphite is the carbon material. At least a portion of the resin is disposed between the graphene layers of the partially exfoliated graphite and is bonded to graphene constituting the partially exfoliated graphite by grafting.

When the carbon material having a graphene layered structure is used as a first carbon material, a second carbon material different from the first carbon material may be used as the material of the spacer. Although the second carbon material is not particularly limited, various active carbons, mesoporous carbon having a porous structure, nano-carbon having a hollow structure, carbon nanotube, carbon nanohorn, and graphene, and the like can be used. Thus, as the spacer material, it is more preferable to use a material having a large specific surface area per se. By using such a material, it becomes possible to support even more sulfur when preparing a composite body with sulfur, which will be described later.

When the spacer is the second carbon material, for example, it is possible to use substitutional type partially exfoliated graphite obtained by substituting the second carbon material for residual resin in the resin-retained partially exfoliated graphite described above.

Such substitutional type partially exfoliated graphite can be obtained by adsorbing the second carbon material as the spacer on the resin-retained partially exfoliated graphite and then heating and removing the residual resin.

As the spacer, inorganic fine particles such as alumina ($Al_2O_3$), silica ($SiO_2$), and titania ($TiO_2$) may be used.

(Sulfur)

At least a portion of the sulfur or sulfur-containing compound is disposed between the graphene layers of the carbon material. It is preferable that all of the sulfur or sulfur-containing compound be disposed between the graphene layers of the carbon material. However, a portion of the sulfur or sulfur-containing compound may be attached to the surface of the carbon material.

Examples of the sulfur-containing compound include, but are not particularly limited to, compounds obtained by bonding an inorganic compound such as lithium sulfide, titanium sulfide or phosphorus sulfide, or an organic compound having a structure of linear alkyl, branched alkyl, cyclic alkane, aromatic hydrocarbon, hetero atom-containing aromatic hydrocarbon or the like to sulfur.

A composite material of the sulfur or sulfur-containing compound and another material may also be used. Examples of such a composite material include a composite material of a conductive polymer, such as polypyrrole, polythiophene, polyaniline, polyacrylonitrile, or poly (3,4-ethylenedioxythiophene), and the sulfur or sulfur-containing compound.

When the resin-retained partially exfoliated graphite or the substitutional type partially exfoliated graphite is used as the carbon material having a graphene layered structure, for example, the graphite can form a composite with the sulfur or sulfur-containing compound as follows.

Specific methods thereof include a method of adding the sulfur or sulfur-containing compound into water or an organic solvent in which the resin-retained partially exfoliated graphite or the substitutional type partially exfoliated graphite is dispersed, adsorbing the sulfur or sulfur-containing compound on the partially exfoliated graphite, followed by composite formation. The adsorption may be chemical adsorption such as grafting or physical adsorption. A method may be used in which after the sulfur or sulfur-containing compound and the partially exfoliated graphite are mixed in a dry manner, the resulting mixture is heated to higher than or equal to the melting point of sulfur (about 115° C.) or the sulfur-containing compound to melt the sulfur or sulfur-containing compound, followed by composite formation.

Instead of the resin-retained partially exfoliated graphite or the substitutional type partially exfoliated graphite, a composite material of an another carbon material having a graphene layered structure and the spacer can be used to form a composite with the sulfur or sulfur-containing compound by the above method.

The content of the sulfur or sulfur-containing compound is not particularly limited, and the content of the sulfur or sulfur-containing compound in the sulfur-carbon material composite body is preferably 20% by weight or more and 90% by weight or less. When the content of the sulfur or sulfur-containing compound is the above-mentioned lower limit or more, the capacity of the secondary battery can be further increased. When the content of the sulfur or sulfur-containing compound is the above-mentioned upper limit or less, it is possible to more effectively suppress an outflow of sulfur at the time of charging and discharging.

[Positive Electrode Material for Lithium Sulfur Secondary Batteries]

The positive electrode material for lithium sulfur secondary batteries of the present invention includes the sulfur-carbon material composite body constituted according to the present invention. Therefore, when a lithium sulfur secondary battery is fabricated using the positive electrode material for lithium sulfur secondary batteries of the present invention, degradation of cycle characteristics at the time of charging and discharging of the lithium sulfur secondary battery hardly occurs, and the capacity of the lithium sulfur secondary battery can be maintained at a high level.

Although the positive electrode material for lithium sulfur secondary batteries of the present invention may be formed only of the active material-carbon material composite body, a binder resin may be further contained from the viewpoint of more easily forming the positive electrode.

As the binder resin, for example, fluorine-based polymers such as polyvinylidene fluoride (PVDF) and polytetrafluoroethylene (PTFE), styrene butadiene rubber (SBR), polybutyral, polyimide resin, acrylic resin, and the like can be selected.

The positive electrode material for lithium sulfur secondary batteries of the present invention may further contain a conductive auxiliary agent. In this case, the conductivity of the positive electrode material for lithium sulfur secondary batteries can be further enhanced.

As the conductive auxiliary agent, for example, carbon black such as acetylene black or Ketjen black, a graphite-based material such as artificial graphite or natural graphite, carbon nanotube, carbon nanofiber, graphene or the like can be used.

The shape of the positive electrode material for lithium sulfur secondary batteries of the present invention is not particularly limited, and those having appropriate shapes such as a film shape, a sheet shape, and a granular shape can be used.

Examples of a method of producing the positive electrode material for lithium sulfur secondary batteries of the present invention include, but are not particularly limited to, a method of dissolving or dispersing the sulfur-carbon material composite body of the present invention in water or an organic solvent to prepare a slurry and then coating the slurry onto a current collector. In preparing the slurry, the binder resin and the conductive auxiliary agent described above can be added, if necessary.

As the current collector, stainless steel, aluminum, carbon paper, copper, or the like can be used. Among them, aluminum is preferably used.

(Lithium Sulfur Secondary Battery)

The lithium sulfur secondary battery according to the present invention includes a positive electrode composed of the positive electrode material for lithium sulfur secondary batteries constituted according to the present invention. Therefore, the cycle characteristics at the time of charging and discharging are hardly degraded, and the capacity can be maintained at a high level.

A negative electrode to be the counter electrode in the lithium sulfur secondary battery is not particularly limited, but for example, a negative electrode can be used which is prepared by coating an active material composed of a carbon-based material such as graphite, silicon or a compound thereof, metallic lithium, or a composite body thereof, on an electrode plate.

As the electrolytic solution of the lithium sulfur secondary battery, for example, it is possible to suitably use an electrolytic solution obtained by dissolving, in a solvent, one or a plurality of electrolytes selected from the group consisting of lithium chloride (LiCl), perchlorolithium (LiClO$_4$), lithium nitrate (LiNO$_3$), lithium trifluoromethanesulfonate (LiCF$_3$SO$_3$), and lithium trifluoromethanesulfonyl amide (LiTFSA). Examples of the solvent include dioxolane (DOL), dimethoxyethane (DME), ethylene carbonate (EC), diethyl carbonate (DEC), and a mixed solvent containing two or more of these solvents.

In constituting the lithium sulfur secondary battery, the positive electrode and the negative electrode are opposed to each other with a separator interposed therebetween, and an electrolytic solution is filled in the gap. As the separator, for example, a porous membrane or a nonwoven fabric composed of polyolefin resin, fluorine-containing resin, acrylic resin, polyimide resin, nylon resin, aramid resin or the like may be used.

Next, the present invention will be clarified by way of specific examples and comparative examples of the present invention. However, the present invention is not limited to the following examples.

Example 1

(Preparation of Resin-Retained Partially Exfoliated Graphite)

10 g of expanded graphite (product name "PF powder 8F" manufactured by Toyo Tanso Co., Ltd., with a BET specific surface area of 22 m$^2$/g), 20 g of ADCA (product name "VINYFOR AC # R-K3" manufactured by EIWA CHEMICAL IND. CO., LTD., with a thermal decomposition temperature of 210° C.) as a thermally decomposable foaming agent, and 200 g of polypropylene glycol (product name "SANNIX GP-3000" manufactured by Sanyo Chemical Industries, Ltd., with an average molecular weight of 3000) were mixed with 200 g of tetrahydrofuran as a solvent to provide a raw material composition. The raw material composition was irradiated with ultrasonic wave using an ultrasonic treatment apparatus (manufactured by HONDA ELECTRONICS CO., LTD.) at 100 W and an oscillation frequency of 28 kHz for 5 hours. The polypropylene glycol (PPG) was adsorbed onto the expanded graphite by the ultrasonic irradiation. Thus, a composition in which the polypropylene glycol is adsorbed onto the expanded graphite was prepared.

Then, after the ultrasonic irradiation, the composition in which the polypropylene glycol is adsorbed onto the expanded graphite was molded by the solution casting method and was dried by heating at a temperature of 80° C. for 2 hours, at 110° C. for 1 hour, and at 150° C. for 1 hour. Thereafter, the composition was maintained at 110° C. for 1 hour and was further maintained at 230° C. for 2 hours. Thereby, the ADCA was pyrolyzed and foamed in the composition.

Next, a heating step of maintaining the temperature at 450° C. for 0.5 hours was conducted. Thereby, the polypropylene glycol was partially pyrolyzed to obtain resin-retained partially exfoliated graphite. In this resin-retained partially exfoliated graphite, a portion of the polypropylene glycol remained, and the polypropylene glycol was adsorbed to graphene constituting partially exfoliated graphite between layers of the partially exfoliated graphite.

As a result of measuring the BET specific surface area of the obtained resin-retained partially exfoliated graphite using a specific surface area measuring apparatus (product number "ASAP-2000" manufactured by SHIMADZU CORPORATION, nitrogen gas), the BET specific surface area was 104 m$^2$/g.

The methylene blue adsorption amount of the obtained resin-retained partially exfoliated graphite was 67.0 µmol/g as a result of measurement by the following procedure. When the BET specific surface area described above was defined as x and the methylene blue adsorption amount was defined as y, the ratio y/x was 0.447.

The methylene blue adsorption amount was measured as follows. Initially, methanol solutions of methylene blue (guaranteed reagent produced by KANTO CHEMICAL CO., INC.) at concentrations of 10.0 mg/L, 5.0 mg/L, 2.5 mg/L and 1.25 mg/L were prepared in volumetric flasks, the absorbance of each solution was measured by an ultraviolet-visible spectrophotometer (product number "UV-1600" manufactured by SHIMADZU CORPORATION), and a calibration curve was created. Next, 10.0 mg/L methylene blue was prepared. Resin-retained partially exfoliated graphite (0.005 to 0.05 g to be changed according to the BET value of a sample) which is a carbon material to be measured, a methylene blue solution (10.0 mg/L, 50 mL), and a stirrer bar were added in a 100 mL eggplant flask. The resulting mixture was treated for 15 minutes by an ultrasonic washing machine (manufactured by AS ONE corporation) and then stirred in a cooling bath (25° C.) for 60 minutes. After reaching an adsorption equilibrium, the mixture was separated into the carbon material (resin-retained partially exfoliated graphite) and the supernatant liquid by centrifugal separation. The absorbance of the 10 mg/L methylene blue solution as blank, and the absorbance of the above-mentioned supernatant liquid were measured by the ultraviolet-visible spectrophotometer. A difference between the absorbance of the blank and the absorbance of the supernatant liquid was calculated.

Finally, a decrease in the concentration of the methylene blue solution was calculated from the difference in the absorbance and the calibration curve described above, and the amount of methylene blue adsorbed to the surface of the carbon material to be measured was calculated by the following formula (1).

Adsorption amount (mol/g)={decrease in concentration of methylene blue solution (g/L)×volume of solvent for measurement (L)}/{molecular weight of methylene blue (g/mol)×mass of carbon material used for measurement (g)}   Formula (1)

(Preparation of Sulfur-Carbon Material Composite Body)

The resin-retained partially exfoliated graphite obtained as described above and sulfur (produced by Sigma-Aldrich) were mixed in a mortar at a weight ratio of 1:2 and then heated at 155° C. for 8 hours to obtain a partially exfoliated graphite-sulfur composite body (sulfur-carbon material composite body). Therefore, the content of sulfur in the sulfur-carbon material composite body was 66.7% by weight.

(Production of Positive Electrode for Lithium Sulfur Secondary Batteries)

The sulfur-carbon material composite body described above and sodium alginate (produced by Kishida Chemical Co., Ltd.) as a binder were mixed at a weight ratio of 9:1 and dispersed in water as a solvent to prepare a slurry. The solid content concentration of the slurry was measured to be 14% by weight. The slurry prepared by the above procedure was coated on carbon paper (product number "TGP-H-060" manufactured by TORAY INDUSTRIES, INC.) as an electrode plate and dried at 60° C. for 12 hours to produce a positive electrode for lithium sulfur secondary batteries.

(Confirmation of Sulfur Supporting State in Positive Electrode for Lithium Sulfur Secondary Batteries)

In order to confirm a sulfur supporting state in the positive electrode for lithium sulfur secondary batteries produced as described above, element analysis was carried out by observing a cross section of the electrode (positive electrode). A cross section of the electrode cut by a slicer was observed with a SEM-EDX apparatus (product number "S-4300 SE/N" manufactured by Hitachi High-Technologies Corporation), and mapping was performed using two types of elements (carbon and sulfur). As a result, it was confirmed that sulfur was mainly supported between layers of the partially exfoliated graphite in the electrode.

As a result of observation of the cross section of the electrode cut by the slicer with SEM (scanning electron microscope, manufactured by Hitachi High-Technologies Corporation, product number "S-4300 SE/N", with a magnification of 30,000 times), it was confirmed that resin existed between the layers of the partially exfoliated graphite and at the end of the partially exfoliated graphite.

Example 2

To a solution prepared by dissolving polyvinylidene fluoride (produced by Kureha Corporation) as a binder in N-methylpyrrolidone, a sulfur-carbon material composite body prepared in the same manner as in Example 1 was added in a weight ratio (solid content) to the binder of 9:1, and the resulting mixture was stirred for 15 minutes and defoamed for 3 minutes to prepare a slurry. The solid content concentration of the slurry was measured to be 41% by weight.

The slurry prepared by the above procedure was coated on an aluminum foil as an electrode plate and dried at 60° C. for 12 hours to produce a positive electrode for lithium sulfur secondary batteries.

Example 3

Preparation of Sulfur-Carbon Material Composite Body by Sodium Thiosulfate Method;

0.13 g of resin-retained partially exfoliated graphite obtained in the same manner as in Example 1 was dispersed in 29.6 g of an aqueous tetrahydrofuran solution (volume ratio 1:1), and the resulting mixture was subjected to ultrasonic treatment for 3 hours. 2.04 g of sodium thiosulfate ($Na_2S_2O_3 \cdot 5H_2O$) and 0.253 ml of hydrochloric acid were added to this dispersion, and the dispersion was stirred at 70° C. for 5 minutes, followed by 5 cycles of washing with water and centrifugation. In addition, vacuum drying was performed at room temperature to obtain a sulfur-carbon material composite body.

A positive electrode for lithium sulfur secondary batteries was produced in the same manner as in Example 1 except that the sulfur-carbon material composite body thus obtained was used.

In the obtained electrode (positive electrode), it was confirmed in the same manner as in Example 1 that sulfur was mainly supported between layers of the partially exfoliated graphite and resin existed between the layers of the partially exfoliated graphite and at the end of the partially exfoliated graphite.

Example 4

Preparation of Partially Exfoliated Graphite in which the Residual Resin is Replaced;

0.3 g of resin-retained partially exfoliated graphite obtained in the same manner as in Example 1 was dispersed in 15 g of tetrahydrofuran (THF). To the obtained dispersion, a dispersion prepared by dispersing 0.15 g of carbon black (product name "Ketjen Black EC 600 JD" manufactured by Lion Corporation) as fine particles in THF was separately added, and partially exfoliated graphite (resin ratio of 65% by weight) and activated carbon were mixed at a weight ratio of 2:1. After the solvent was removed from the resulting mixed solution by filtration, vacuum drying was carried out. Subsequently, the resulting powder was heated at 400° C. for 3 hours to selectively remove only the resin and thus to obtain a composite body. Therefore, in the obtained composite body, the resin was removed, and the weight ratio of the partially exfoliated graphite as a carbon material and the activated carbon as fine particles was 1:1.

A sulfur-carbon material composite body and a positive electrode for lithium sulfur secondary batteries were fabricated in the same manner as in Example 1 except that substitutional type partially exfoliated graphite thus obtained was used in place of the resin-retained partially exfoliated graphite of Example 1.

In the obtained electrode (positive electrode), it was confirmed in the same manner as in Example 1 that sulfur was mainly supported between layers of the partially exfoliated graphite. As a result of observation of the cross section of the electrode cut by the slicer with SEM (scanning electron microscope, manufactured by Hitachi High-Technologies Corporation, product number "S-4300 SE/N", with a magnification of 30,000 times), it was confirmed that carbon black as fine particles existed between the layers of the partially exfoliated graphite and at the end of the partially exfoliated graphite.

Comparative Example 1

Ketjen black (product name "EC 300J" manufactured by Lion Corporation) was used in place of resin-retained partially exfoliated graphite, and Ketjen black and sulfur (produced by Sigma-Aldrich) were mixed in a mortar at a weight ratio of 1:2 and then heated at 155° C. for 8 hours to prepare a composite body.

The obtained composite body and PVA (71% saponified product, manufactured by Kuraray Co., Ltd.) as a binder were mixed at a weight ratio of 9:1 and dispersed in N-methylpyrrolidone as a solvent to prepare a slurry. The solid content concentration of the slurry was measured to be 18% by weight.

The slurry was coated on carbon paper (product number "TGP-H-060" manufactured by TORAY INDUSTRIES, INC.) and dried at 60° C. for 12 hours to produce a positive electrode for lithium sulfur secondary batteries.

Comparative Example 2

A slurry was prepared in the same procedure as in Comparative Example 1 except that acetylene black (manufactured by Denka Company Limited.) was used instead of Ketjen black. A positive electrode for lithium sulfur secondary batteries was produced in the same procedure as in Comparative Example 1 using the obtained slurry.

(Evaluation Method)

In examples and comparative examples, the BET specific surface area and the sulfur supporting amount were measured in the following manner.

BET Specific Surface Area;

The BET specific surface area was measured using nitrogen gas by a specific surface area measuring apparatus (product number "ASAP-2000" manufactured by SHIMADZU CORPORATION).

Sulfur Supporting Amount;

The sulfur supporting amount was calculated by subtracting a weight of a current collector from a weight of an electrode and multiplying by a charge ratio of sulfur.

(Fabrication of Lithium Sulfur Secondary Battery)

A lithium sulfur secondary battery was fabricated using the positive electrode for lithium sulfur secondary batteries produced in each of Examples 1 and 2 and Comparative Examples 1 and 2. FIG. 1 is a schematic diagram for illustrating a method of fabricating the lithium sulfur secondary battery.

Specifically, the positive electrode for lithium sulfur secondary batteries fabricated in each of Examples 1 and 2 and Comparative Examples 1 and 2 was punched to a diameter of 10 mm to obtain a positive electrode 2. The positive electrode 2, a separator 3 (manufactured by Celgard with a thickness of 200 µm), a lithium metal negative electrode 4 (with a thickness of 100 µm), and a negative electrode lid 5 were stacked in this order on a 2032 type coin cell container 1, a gap between the positive electrode 2 and the separator 3 and a gap between the separator 3 and the lithium metal negative electrode 4 were filled with 160 µL of an electrolytic solution, the container was sealed, and thus a coin cell lithium sulfur secondary battery was fabricated. The electrolytic solution used was 1 mol/L lithium trifluoromethanesulfonylamide (LiTFSA) and 0.1 mol/L $LiNO_3$ (DOL/DME 1:1 wt % mixed solution).

(Charge-Discharge Test)

A charge-discharge test was carried out using the coin cell lithium sulfur secondary battery fabricated as described above. Charging and discharging was carried out at a charge/discharge rate of 1/12 C in a voltage range of 1.7 V to 3.3 V. In the charge-discharge test carried out in this manner, the capacity retention rate after 50 cycles of charging and discharging represented by the following formula (2) is shown in the following Table 1.

Capacity retention rate (%)=((capacity after 50 cycles of charging and discharging)/(initial capacity))×100     Formula (2)

As shown in the following Table 1, in Examples 1 and 2, cycle deterioration of the battery capacity was suppressed as compared with Comparative Examples 1 and 2, and it was confirmed that the capacity could be maintained at a high level.

Although not shown in the following Table 1, it was confirmed that the same capacity retention rate as in Example 1 could be obtained in Examples 3 and 4.

TABLE 1

| | Type of carbon material | BET specific surface area ($m^2/g$) | Sulfur supporting amount ($mg/cm^2$) | Capacity retention rate |
|---|---|---|---|---|
| Ex. 1 | Resin-retained partially exfoliated graphite | 104 | 3.82 | 81.8% |
| Ex. 2 | Resin-retained partially exfoliated graphite | 110 | 2.22 | 84.8% |

TABLE 1-continued

|  | Type of carbon material | BET specific surface area (m²/g) | Sulfur supporting amount (mg/cm²) | Capacity retention rate |
|---|---|---|---|---|
| Comp. Ex. 1 | Ketjen black | 800 | 1.91 | 60.9% |
| Comp. Ex. 2 | Acetylene black | 100 | 2.68 | 62.0% |

EXPLANATION OF SYMBOLS

1: 2032 type coin cell container (positive electrode can)
2: Positive electrode
3: Separator
4: Lithium metal negative electrode
5: Negative electrode lid

The invention claimed is:

1. A sulfur-carbon material composite body comprising:
a first carbon material having a graphene layered structure;
a spacer at least partially disposed between graphene layers of the first carbon material or at an end of the first carbon material; and
sulfur or a sulfur-containing compound at least partially disposed between the graphene layers of the first carbon material or at the end of the first carbon material,
wherein the first carbon material is partially exfoliated graphite which has a graphite structure and in which an edge portion of graphite is partially exfoliated.

2. The sulfur-carbon material composite body according to claim 1, wherein a content of the sulfur or sulfur-containing compound in the sulfur-carbon material composite body is 20% by weight or more and 90% by weight or less.

3. The sulfur-carbon material composite body according to claim 1, wherein a C/O ratio of the first carbon material is 2 or more and 20 or less.

4. The sulfur-carbon material composite body according to claim 1, wherein the spacer comprises a resin.

5. The sulfur-carbon material composite body according to claim 1, wherein the spacer comprises a second carbon material different from the first carbon material.

6. A positive electrode material for lithium sulfur secondary batteries, comprising the sulfur-carbon material composite body according to claim 1.

7. A lithium sulfur secondary battery comprising a positive electrode containing the positive electrode material for lithium sulfur secondary batteries according to claim 6.

* * * * *